United States Patent Office

Re. 28,011
Reissued May 14, 1974

28,011

PHARMACEUTICAL PREPARATION

Matthew C. Urbin, 4524 La Barca Drive, Tarzana, Calif. 91356

Original No. 3,639,579, dated Feb. 1, 1972, Ser. No. 96,998, Dec. 10, 1970, which is a continuation of abandoned application Ser. No. 864,526, Oct. 7, 1969. Application for reissue Nov. 20, 1972, Ser. No. 308,000
Int. Cl. A61k *19/00*
U.S. Cl. 424—94 6 Claims

Matter enclosed in heavy brackets [ ] appears in the original patent but forms no part of this reissue specification; matter printed in italics indicates the additions made by reissue.

ABSTRACT OF THE DISCLOSURE

A pharmaceutical preparation is provided for the treatment of hemorrhoids, and which contains oxidase enzymes, such as monoamine oxidase, or diamine oxidase, or both. The object of the invention is to destroy the amines formed in the colon by bacteria. The amines are destroyed by the oxidizing action of the oxidases on the tissue and by the production of oxygen. The oxygen is produced, in some instances, by the action of the tissue itself, or a catalase enzyme may be added to the preparation which will decompose the hydrogen peroxide which is present into water and oxygen.

[This application is a continuation of copending application Ser. No. 864,526, which was filed Oct. 7, 1969, in the name of Matthew C. Urbin, now abandoned.]

*This is a Reissue of Pat. No. 3,639,579, issued Feb. 1, 1972, which is a continuation of copending application Ser. No. 864,526, now abandoned.*

BACKGROUND OF THE INVENTION

The enzyme names used in the following specification are drived from "Recommendations 1964 of the International Union of Biochemistry" published in Comprehensive Biochemistry, Marcel Florkin, Elsevier, Amsterdam, N.Y. (1965).

| Reference No. | Systematic name | Recommended trivial name | Other names not recommended |
|---|---|---|---|
| 1.4.3.6 | Diamine: oxygen oxidoreductase (deaminating). | Diamine oxidase histaminase. | |
| 1.4.3.4 | Monomine: oxygen oxidoreductase (deaminating). | Monoamine oxidase | Tyraminase; amine oxidase. |
| 1.11.1.6 | Hydrogen-peroxide: hydrogen peroxide oxiporeductase. | Catalase | |

All of the enzymes referred to in the following specification, and particularly with respect to the specific formulations, were purchased from Sigma Chemical Co., 3500 DeKalb St., St. Louis, Mo., 63118.

(a) D 7876 Diamine Oxidase Grade II: From Hog Kidney
(b) Monoamine Oxidase: Type 1: Crude; From Beef Plasma
(c) Catalase: Stock No. C–10 Purified Powder.

The prior art pharmaceutical preparations for the treatment of hemorrhoids are generally not completely satisfactory due primarily to the lack of complete understanding in the prior art as to the cause and cure of hemorrhoids. It has been determined that the cause of itching and swelling in the region of the colon which produces hemorrhoids is due primarily to the formation of amines by bacteria in the colon.

In the practice of the present invention, these amines are destroyed by the application of suitable oxidase enzymes and by the presence of a catalase enzyme which will provide the necessary oxygen. The catalase enzyme may in some instances be present in the tissue, or it may be supplied as an ingredient of the preparation.

The action when, for example, a monoamine oxidase is used, may be represented as follows:

$$\underset{\text{(Amine)}}{RCH_2} \longrightarrow NH_2 + O_2 + H_2O \xrightarrow[\text{Oxidase}]{\text{Monoamine}} R\overset{H}{\overset{|}{C}}{=}O + H_2O_2 + NH_3$$

The following references are give for the isolation of monoamine oxidase and diamine oxidase. They are typical of the prior art isolation procedures for these enzymes.

Purification monoamine oxidase:

(a) "Human Plasma Monoamine Oxidase," Charles M. McEwen, Jr. Journal of Biol. Chem. 240, 2003–10 (1965)
(b) "Monoamine Oxidase" Hideaki Yamada and Kerry T. Yasunobu Journal of Biol. Chem. 237, 1511–16 (1962)

Purification Diamine Oxidase:

(a) "Diamine Oxidase," Herbert Tabor, Journal of Biol. Chem. 188, 125–36 (1951)
(b) "Purification and Identification of Hog-Kidney Histaminase," R. Kapeller-Adler and H. MacFarland, Biochim. Biophys. Acta 67, 542–65 (1963)
(c) "Purification of Pig-Kidney Diamine Oxidase and its Identity with Histaminase," B. Mondovi, G. Rotilo, A. Finazzi, and A. Scioscia-Santoro, Biochem. J. 91, 408–15 (1963)
(d) "Diamine Oxidase" Chapter 11 by E. Albert Zeller, from The Enzymes, volume 8 editors P. D. Boyer, H, Lardy, K. Myrback, Academic Press, New York, 1963
(e) "Reinvestigation of the Substrate Specificity of Pig Kidney Diamine Oxidase," W. G. Bardsley, C. M. Hill, and R. W. Lobley, Biochem. J., 117, 169–76 (1970)

The name catalase is used in enzyme nomenclature both to describe the class of enzymes and the individual enzyme. Reference has previously been given to the "Recommediations 1964 of the International Union of Biochemistry." A second reference source is given for the use of the name Catalase to describe the enzyme used in this patent application. Chapter 6 "Catalases" by P. Nicholls and G. R. Schonbaum from The Enzymes, volume 8 editors P. D. Boyer, H. Lardy, K. Myrback, Academic Press, New York, 1963.

DETAILED DESCRIPTION OF SPECIFIC EMBODIMENTS OF THE INVENTION

The following formulations have been made and have proven to be completely satisfactory in immediately terminating itching caused by hemorrhoids, and in reducing the swelling within one or two days.

FORMULATION A (a) An ointment base and an enzyme stabilizing agent was compounded by melting 50 grams polyethylene glycol 6000 with 30 grams of polyethylene glycol 1540, and by then cooling the mixture to 50° C.

(b) Five milligrams of monoamine oxidase (Sigma Type 1: crude beef plasma) was then dissolved in 20 cc. of 0.1 molar phosphate buffer (pH 7.2), the phosphate buffer serving to hold the pH of the preparation in a predetermined range and to prevent the preparation from assuming the pH of the area being treated. The tentative activity is as follows:

1 mg. will produce an initial change in the optical density (OD) of about 0.1/minute at 25° C. in a three-milliliter reaction mixture containing benzylamine. Reference—Taber et al. Journal of Biological Chemists, 208 645 (1964).

(c) The formulation was prepared by mixing (a) and (b) and by allowing the mixture to solidify.

On the basis of the monoamine oxidase in the Formulation A, it was speculated that the addition of catalase may well have a synergistic effect on the reaction by removing the most noxious of the end products, and it would also serve as an agent for supplying one of the necessities for the reaction, namely oxygen. Accordingly, the following Formulation B was compounded, and found to be completely effective.

FORMULATION B (a) An ointment base and enzyme stabilizing action was compounded by melting 50 grams of polyethylene glycol (Carbowax) 6000 with 30 grams of polyethylene glycol (Carbowax) 1540, and by then cooling the mixture to 50° C.

(b) Five milligrams of catalase (Sigma stock #C–10 purified from beef plasma) (activity 2000–5000 sigma units/gram) was then dissolved in 20 cc. of 0.1 M phosphate buffer (pH 7.2) (one Sigma unit will decompose one micromole of hydrogen peroxide per minute at pH 7.0 at 25° C. while the hydrogen peroxide concentration falls from 10.3 to 9.2 micromoles per milliliter of reaction mixture). The rate of disappearance of the hydrogen peroxide is followed by observing the rate of decrease in optical density at 240 micromoles).

(c) Mix (a) and (b) and allow the mixture to solidify.

The rationale of Formulation B may be represented by the following:

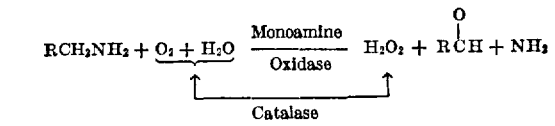

It has also been found that histamine, cadaverins and putrescine are formed in the colon, and these elements also are effective in the formation and stimulation of hemorrhoids. For that reason, in the following preparation, Formulation C, diamine oxidase is added to oxidize the aforesaid elements. For example, one milligram of diamine oxidase will oxidize approximately 0.7 micromole of putrescine per hour at a pH of 7.2 and at 37° C.

FORMULATION C (a) An ointment base was compounded by melting 50 grams of polyethylene glycol (Carbowax) 6000 with 30 grams of polyethylene glycol (Carbowax) 1540, and by then cooling the mixture to 50° C.

(b) Five milligrams of monoamine oxidase (Sigma Type 1: crude beef plasma); 5 milligrams of diamine oxidase (Sigma Grade 11 from hog kidney); and 5 milligrams of catalase (Sigma stock #C–10—purified powder from beef plasma) was then dissolved in 20 cc. of 0.1 M phosphate buffer (pH 7.2).

(c) The formation was prepared by mixing (a) and (b) and allowing the mixture to solidify.

Formulation C was found to be very effective in the treatment of hemorrhoids. Moreover, tests were made on all the preceding formulations, and they were found to maintain their activity indefinitely. For example, Formulation B was tested at two month intervals for almost a year and was found to lose none of its activity.

FORMULATION D (a) An ointment and enzyme stabilizing agent was compounded by melting 25 grams of polyethylene glycol (Carbowax) 6000 with 15 grams of polyethylene glycol (Carbowax) 1540, and by then cooling the mixture to 50° C.

(b) 2.5 milligrams of monoamine oxidase (Sigma Type 1: crude beef plasma); 2.5 milligrams diamine oxidase (Sigma Grade 11 from hog kidney); and 2.5 milligrams catalase (Sigma stock #C–10—purified powder from beef plasma) were then dissolved in 10 cc. of 0.1 M. phosphate buffer (pH 7.2).

(c) The formulation was prepared by mixing (a) and (b) and allowing the mixture to solidify.

FORMULATION E (a) An ointment and enzyme stabilizing agent was compounded by melting 25 grams of polyethylene glycol (Carbowax) 6000 with 15 grams of polyethylene glycol (Carbowax) 1540, and by then cooling the mixture to 50° C.

(b) As a second step, 2.5 milligrams diamine oxidase (Sigma Grade 11 from hog kidney), and 2.5 milligrams catalase (Sigma stock #C–10—purified powder from beef plasma) were then dissolved in 10 cc. of 0.1 molar phosphate buffer (pH 7.2).

(c) The formulation was prepared by mixing (a) and (b) allowing the mixture to solidify.

FORMULATION F (a) An ointment and enzyme stabilizing agent was compounded by melting 25 grams of polyethylene glycol (Carbowax) 6000 with 15 grams of polyethylene glycol (Carbowax) 1540, and by then cooling the mixture to 50° C.

(b) Then, 2.5 milligrams of monoamine oxidase (Sigma Type 1: crude beef plasma); and 2.5 milligrams catalase (Sigma stock #C–10—purified powder from beef plasma) were dissolved in 10 cc. of 0.1 M phosphate buffer (pH 7.2).

(c) The formulation was prepared by mixing (a) and (b) allowing the mixture to solidify.

FORMULATION G (a) An ointment and enzyme stabilizing agent was compound by melting 25 grams polyethylene glycol (Carbowax) 4000 with 20 grams polyethylene glycol (Carbowax) 400 and by cooling the mixture to 50° C.

(b) 0.1 milligram of monoamine oxidase (Sigma Type 1: crude beef plasma); 0.1 milligram diamine oxidase (Signma Grade 11 from hog kidney); and 0.1 milligram catalase (Sigma stock #C–10—purified powder from beef plasma) were then dissolved in 10 cc. of 0.1 M phosphate buffer (pH 7.2).

(c) The formulation was prepared by mixing (a) and (b) allowing the mixture to solidify.

FORMULATION H (a) An ointment and enzyme stabilizing agent was compounded by melting 25 grams polyethylene glycol (Carbowax) 4000 with 20 grams polyethylene glycol (Carbowax) 400 and by cooling the mixture to 50° C.

(b) 2.5 milligrams of monoamine oxidase (Sigma Type 1: crude beef plasma); 2.5 milligrams diamine oxidase (Sigma Grade 11 from hog kidney); and 2.5 milligrams catalase (Sigma stock #C–10—purified powder from beef plasma) were then dissolved in 10 cc. of 0.1 M phosphate buffer (pH 7.2).

(c) The formulation was prepared by mixing (a) and (b) allowing the mixture to solidify.

FORMULATION I (a) An ointment and enzyme stabilizing agent was compounded by melting 25 grams polyethylene glycol (Carbowax) 4000 with 20 grams polyethylene glycol (Carbowax) 400 and by cooling the mixture to 50° C.

(b) 50.0 milligrams of monoamine oxidase (Sigma Type 1: crude beef plasma); 50.0 milligrams of diamine oxidase (Sigma Grade 11 from hog kidney); and 50.0 milligrams catalase (Sigma stock #C–10—purified powder from beef plasma) were then dissolved in 10 cc. of 0.1 M phosphate buffer (pH 7.2).

(c) The formulation was prepared by mixing (a) and (b) and allowing the mixture to solidify.

The latter formulations were also found to be effective in the treatment of hemorrhoids. However, for universal application, and for most effective use, the Formulations C or D are considered to be the preferred formulations at present.

The invention provides, therefore, a formulation which is relatively simple and inexpensive to prepare, and which uses readily available and relatively inexpensive ingredients. The formulation is also easy to apply, and it has been found most effective in accomplishing its desired purpose.

It will be appreciated that although particular formulations have been shown and described, modifications may be made, and it is intended in the claims to cover all modifications which come within the spirit and scope of the invention.

What is claimed is:

1. A pharmaceutical formulation for the treatment of hemorrhoids, and which includes ingredients in approximately the following proportions: 0.1–50 milligrams monoamine oxidase, and 10–20 cubic centimeters of a stabilizing buffer in which said oxidase is dissolved to prevent the formulation from assuming the pH of the area being treated.

2. A pharmaceutical formulation for the treatment of hemorrhoids, and which includes ingredients in approximately the following proportions: 0.1–50 milligrams monoamine oxidase derived from crude beef plasma and dissolved in 10–20 cubic centimeters of a phosphate buffer of a pH 7.2 and 0.1 molar, said phosphate buffer being selected to hold the pH of the formulation in a predetermined range and to prevent the formulation from assuming the pH of the area being treated.

3. The formulation defined in claim 2, and which includes an ointment base in approximately the following proportions: 50 grams polyethylene glycol 6000 and 30 grams of polyethylene glycol 1540.

4. The formulation defined in claim 2, and which includes approximately 5 milligrams of catalase purified from beef plasma and dissolved in said phosphate buffer.

5. The formulation defined in claim 4, and which includes approximately 5 milligrams diamine oxidase derived from hog kidney and dissolved in said phosphate buffer to oxidize histamine, cadaverins, and putrescine formed in the colon.

*6. A pharmaceutical preparation for the treatment of hemorrhoids, and which includes ingredients in approximately the following proportions: 0.1–50 milligrams diamine oxidase; 0.1–50 milligrams catalase; and 10–20 cubic centimeters of a stabilizing buffer in which said oxidase is dissolved to prevent the formulation from assuming the pH of the area being treated.*

References Cited

The following references, cited by the Examiner, are of record in the patented file of this patent or the original patent.

FOREIGN PATENTS 1,091 M 1/1962 France ---------- 424—94

OTHER REFERENCES

Chemical Abstracts (1), vol. 52, entry 12029d, 1958.
Chemical Abstracts (2), vol. 66, entry 84507u, 1967.
Chemical Abstracts (1), vol. 52, entry 12029d, 1958.
Chemical Abstracts (2), vol. 66, entry 84507u, 1967.

RICHARD L. HUFF, Primary Examiner